(12) United States Patent
Shokhor et al.

(10) Patent No.: US 8,560,709 B1
(45) Date of Patent: Oct. 15, 2013

(54) SYSTEM AND METHOD FOR DYNAMIC POLICY BASED ACCESS OVER A VIRTUAL PRIVATE NETWORK

(75) Inventors: Sergey Shokhor, Fremont, CA (US); Andrey Shigapov, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 1450 days.

(21) Appl. No.: 10/786,862

(22) Filed: Feb. 25, 2004

(51) Int. Cl.
*G06F 15/16* (2006.01)
*G06F 15/173* (2006.01)

(52) U.S. Cl.
USPC ............ 709/229; 709/224; 709/225; 709/203

(58) Field of Classification Search
USPC .......................................................... 709/229
See application file for complete search history.

(56) References Cited

U.S. PATENT DOCUMENTS

| | | | | |
|---|---|---|---|---|
| 5,319,562 | A * | 6/1994 | Whitehouse | 705/403 |
| 5,974,549 | A * | 10/1999 | Golan | 726/23 |
| 6,502,131 | B1 * | 12/2002 | Vaid et al. | 709/224 |
| 6,546,423 | B1 | 4/2003 | Dutta et al. | |
| 6,684,253 | B1 * | 1/2004 | Whitaker et al. | 709/229 |
| 6,687,831 | B1 * | 2/2004 | Albaugh et al. | 726/7 |
| 6,766,407 | B1 * | 7/2004 | Lisitsa et al. | 710/316 |
| 6,836,888 | B1 * | 12/2004 | Basu et al. | 718/104 |
| 6,917,980 | B1 * | 7/2005 | Gusler et al. | 709/229 |
| 6,925,495 | B2 * | 8/2005 | Hegde et al. | 709/223 |
| 6,931,546 | B1 * | 8/2005 | Kouznetsov et al. | 726/23 |
| 6,944,761 | B2 * | 9/2005 | Wood et al. | 713/155 |
| 6,954,792 | B2 * | 10/2005 | Kang et al. | 709/229 |
| 6,981,257 | B2 * | 12/2005 | Teubner | 718/101 |
| 6,990,591 | B1 * | 1/2006 | Pearson | 726/22 |
| 6,993,663 | B1 * | 1/2006 | Paya et al. | 711/163 |
| 7,007,025 | B1 * | 2/2006 | Nason et al. | 707/9 |
| 7,007,052 | B2 * | 2/2006 | Jiang et al. | 708/270 |
| 7,107,052 | B2 * | 9/2006 | Mahany | 455/432.1 |
| 7,139,811 | B2 * | 11/2006 | Lev Ran et al. | 709/217 |
| 7,181,731 | B2 * | 2/2007 | Pace et al. | 717/136 |
| 7,185,364 | B2 * | 2/2007 | Knouse et al. | 726/8 |
| 7,200,272 | B2 * | 4/2007 | Ishikawa | 382/233 |
| 7,237,263 | B1 * | 6/2007 | Boscolo et al. | 726/15 |
| 7,257,623 | B2 * | 8/2007 | Viavant et al. | 709/220 |
| 7,257,741 | B1 * | 8/2007 | Palenik et al. | 714/43 |
| 7,260,224 | B1 * | 8/2007 | Ingle et al. | 380/279 |
| 7,260,388 | B1 * | 8/2007 | Myers | 455/419 |

(Continued)

OTHER PUBLICATIONS

Filetransit, Print Distributor 2.0, Released Nov. 12, 2002, 1-3 of 10.*

(Continued)

*Primary Examiner* — Richard G Keehn
(74) *Attorney, Agent, or Firm* — Frommer Lawrence & Haug LLP; John W. Branch

(57) ABSTRACT

An apparatus and method are directed to managing access to an enterprise resource over a virtual private network by employing a dynamic policy. A client device is configured to log into a network device. The network device receives information about the client device, including information about its configuration and environment. Based, in part, on received information a policy for access is applied to the client device. For example, in one embodiment, the policy may allow only email access from a public kiosk client device, but full intranet access from an enterprise configured client device. The policy may further enable a restriction for the client device that may restrict, for example, what documents may be saved by the client device. In one embodiment, the restriction is enabled using a virtual sandbox.

33 Claims, 4 Drawing Sheets

(56) References Cited

U.S. PATENT DOCUMENTS

| | | | |
|---|---|---|---|
| 7,269,847 B2 * | 9/2007 | Wesinger et al. | 726/11 |
| 7,272,855 B1 * | 9/2007 | Yemeni et al. | 726/23 |
| 7,308,703 B2 * | 12/2007 | Wright et al. | 726/1 |
| 7,313,618 B2 * | 12/2007 | Braemer et al. | 709/225 |
| 7,313,822 B2 * | 12/2007 | Ben-Itzhak | 726/24 |
| 7,322,044 B2 * | 1/2008 | Hrastar | 726/22 |
| 7,328,453 B2 * | 2/2008 | Merkle et al. | 726/23 |
| 7,337,174 B1 * | 2/2008 | Craig | 707/100 |
| 7,430,524 B2 * | 9/2008 | Shah et al. | 705/26 |
| 2002/0111852 A1 * | 8/2002 | Levine | 705/14 |
| 2003/0081621 A1 * | 5/2003 | Godfrey et al. | 370/400 |

OTHER PUBLICATIONS

Filetransit, Print Distributor 2.0, released Nov. 12, 2002, 1-3 of 10 {Submitted to Applicant With Previous Office Action}.*

* cited by examiner

SYSTEM AND METHOD FOR DYNAMIC POLICY BASED ACCESS OVER A VIRTUAL PRIVATE NETWORK

FIELD OF THE INVENTION

The invention relates generally to remote computing access, and more particularly but not exclusively to providing a dynamic policy based remote access to an enterprise resource over a virtual private network.

BACKGROUND OF THE INVENTION

As the Internet becomes an important method for organizations to provide access to mission critical applications, security becomes a larger and more prevalent issue of concern. Often an organization may deploy security mechanisms that enable remote access while maintaining a level of authentication and authorization to those resources. For example, many organizations employ virtual private networks (VPNs) to provide employees with remote access to the organization's resources. Employees are often allowed to obtain access to important resources from a variety of computing devices, including kiosks, mobile devices, and home computers, as well as computing devices provided and maintained by the organization.

However, use of computing devices that are not maintained by the organization may still result in increased security risks. For example, such computing devices may be inadequately configured with the security components that an organization may demand. As such, although the end-user may be sufficiently authenticated for access, the computing device employed to obtain that access may be inadequate. Requiring that every employee use only those computing devices that are issued and maintained by the organization, however, is often both impractical and costly. Thus, there is a need in the industry to better secure enterprise resources accessed by remote computing devices. Therefore, it is with respect to these considerations and others that the invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE PREFERRED EMBODIMENT

Figure 1:
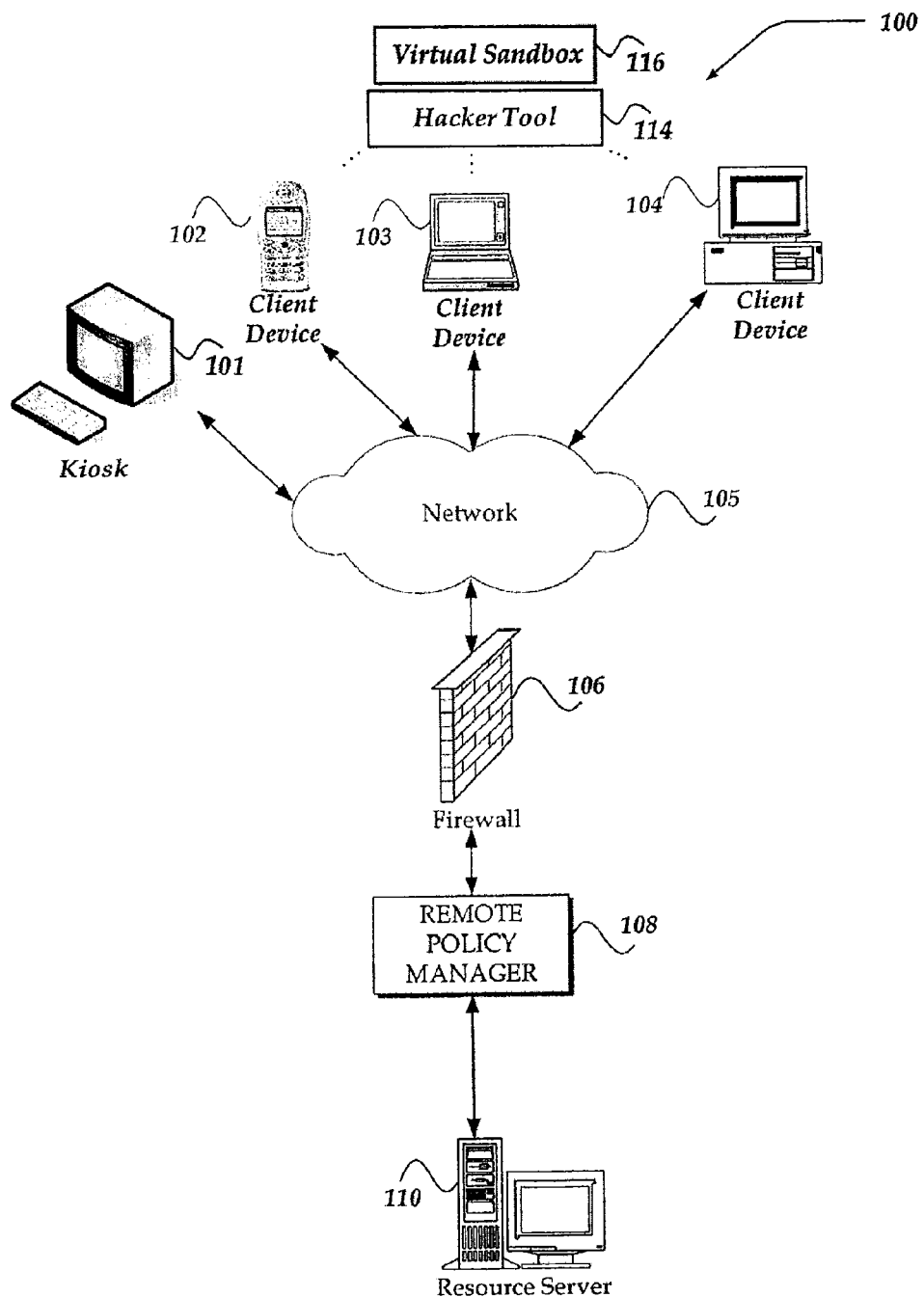
FIG. 1 shows a functional block diagram illustrating one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

Briefly stated, the invention is directed towards a system, apparatus, and method for managing a secure access to an enterprise resource over a VPN by employing a dynamic policy. The dynamic policy may be managed by a System Administrator, or the like, to enable quick and granular control over the enterprise network resource. In one embodiment of the system a client device is configured to log into a server. The server may provide a component, such as a program, control, script, or the like to the client device. The component performs an inspection of the client device and provides information about its configuration and environment back to the server. Based, in part, on the received information a policy for access is applied to the client device. For example, in one embodiment, the policy may allow only email access from a public kiosk client device, but more complete intranet access from an enterprise configured client device. The policy may further enable a virtual sandbox for the client device that may restrict, for example, input/output (I/O) operations by the client device. Such restrictions may include, but are not limited to, inhibiting a copy to/from a clip-board, a copy to/from a file, restricting a save operation, restricting a print operation, and the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102-104, network 105, firewall 106, remote policy manager (RPM) 108, and resource server 110. Network 105 enables communication between client devices 102-104, and firewall 106. RPM 108 is in communication with firewall 106 and resource server 110. Although not shown, resource server 110 typically resides within an enterprise's intranet, while firewall 106 and RPM 108 may reside within an enterprise's demilitarized zone (DMZ).

Generally, client devices 102-104 may include virtually any computing device capable of connecting to another computing device to send and receive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client devices 102-104 may be any device that is capable of connecting using a wired or wireless communication medium such as a PDA, POCKET PC, wearable computer, and any other device that is equipped to communicate over a wired and/or wireless communication medium.

Client devices 101-104 may be configured as public systems, such as kiosks, home computing devices, personal computing devices, personal mobile computing device, and the like, that are used by an employee, or the like, of the enterprise to access an enterprise resource, such as resource server 110. Such client devices may not be issued or maintained by the enterprise, typically resulting in a classification as an untrusted device.

Similarly, client devices 101-104 may be maintained, issued, and configured by a business partner, and the like. These client devices may also be classified as untrusted devices. Such client devices may be employed by such non-employees to the enterprise to seek access to an enterprise resource, for example, to share a file, obtain extranet access, and a similar limited resource.

Client devices 101-104 may also be configured, maintained, and issued by the enterprise to an employee, and the like, of the enterprise. Such client devices may be considered to be trusted devices.

The invention is not limited, however, to a binary level of trust. Degrees of trust may also be employed to describe client devices 101-104. For example, a personal laptop may be considered to have a higher level of trust than a kiosk. Similarly, an enterprise maintained and issued laptop may have a higher level of trust than the personal laptop, but a lower level of trust than an enterprise desktop.

Client devices 101-104 typically include a browser application, and the like, that is configured to enable network access through firewall 106 to communicate with RPM 108. Client devices 101-104 may be further configured to enable a secure communication with RPM 108 using such mechanisms as Secure Sockets Layer (SSL), IPSec, Tunnel Layer Security (TLS), and the like. In one embodiment, client devices 101-104 are configured to establish a communication with RPM 108 employing an IPSec VPN.

Client devices 101-104 may further include a client application, and the like, that is configured to manage various actions.

Network 105 is configured to couple client devices 101-104, and the like, with resource server 110 through firewall 106 and RPM 108. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, 5 communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 101-104 and firewall 106 to RPM 108, resource server 110, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Firewall 106, which may be an optional component of the invention, may include one or more computing devices configured to shield a resource, such as resource server 110, within a locally managed security perimeter (not shown) from an undesired external access. Firewall 106 may include a filter, gateway, network address translator (NAT), and the like configured to minimize the undesired external accesses. As such firewall 106 may be implemented on a variety of computing devices including personal computers, desktop computers, multiprocessor systems, microprocessor-based devices, network PCs, servers, proxy servers, reverse proxy servers, gateways, network appliances, and the like. In one embodiment, firewall 106 is configured to enable access employing a VPN.

RPM 108 is described in more detail below in conjunction with FIG. 2. Briefly, however, RPM 108 includes virtually any network device configured to enable quick and granular policy based access control over a network resource, such as resource server 110. As such, RPM 108 may be implemented on a variety of computing devices including personal computers, desktop computers, multiprocessor systems, microprocessor-based devices, network PCs, servers, proxy servers, reverse proxy servers, gateways, network appliances, and the like.

Through the policy, an administrator, or the like, may authorize access to an application, server, and other resources, based, in part, on a configuration of a client device. For example, a policy access may be configured to enable a client device to access an email resource from a client device configured as a kiosk, with active cache and temporary file cleanup. The policy may restrict access to other network resources by employing, for example, a virtual sandbox, or the like. In another example, another policy access may be configured to enable another client device full intranet network resource access from a trusted client device, such as an enterprise provided laptop, with active firewall and virus detection software. Additionally, a virtual sandbox, or the like, may be employed to provide deletion of data in files, caches, and the like, upon termination of a connection. However, the dynamic policy access is not limited to these examples, and virtually any policy may be employed without departing from the scope of the invention.

RPM 108 may be configured to provide a component, such as an application, java control, program, script, applet, active-X control, and the like, to the client device seeking access to an internal resource, such as resource server 110. RPM 108 may be further configured to receive information from the component that includes environment data about the client device. Such environment data may include, but is not limited to browser type residing on the client device, operating system, software patch level, type of certificate associated with the client device, encryption capability of the client device, antivirus product installed, and the like. Environment data may also indicate whether security software is installed, and active, disabled, or the like. Environment data may further include information indicating whether the client device is managed by the enterprise, as well as whether the client device is an untrusted, trusted device, or the like. Environment data may also include information associated with whether the client device is a laptop, personal computer, kiosk, mobile device, and the like.

Resource server 110 represents virtually any resource service, device, and the like, to which client devices 101-104 may seek access. Such resources may include, but is not limited to, web services, mail services, database services, repositories, legacy services, telnet services, FTP services, and the like. As such resource server 110 may be implemented on a variety of computing devices including personal computers, desktop computers, multiprocessor systems, microprocessor-based devices, network PCs, servers, and the like.

Illustrative Server Environment

Figure 2:
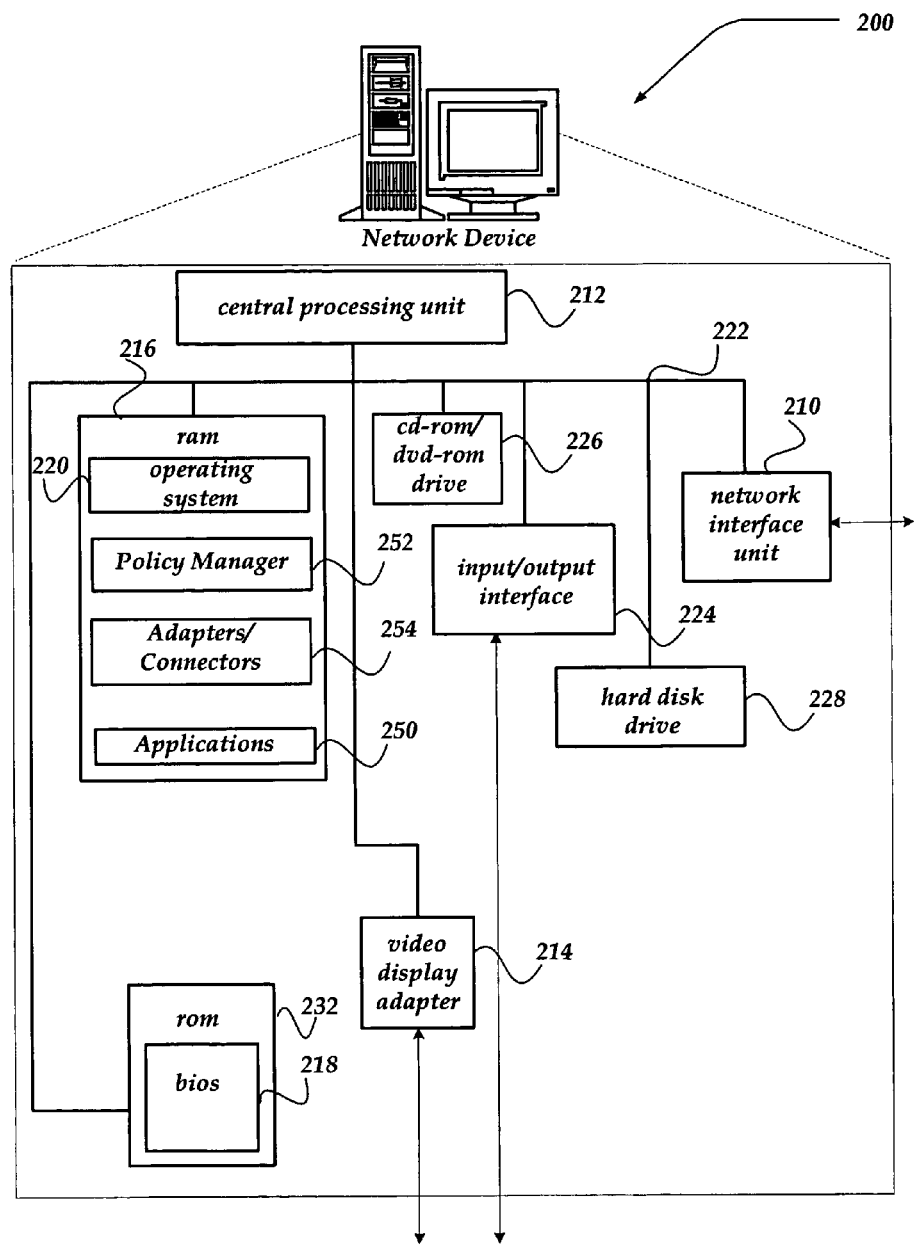
FIG. 2 shows one embodiment of a server device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, RPM 108 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, customizable user interface programs, IPSec applications, security programs, VPN programs and so forth. Mass storage may further include applications such as policy management module 252, and adaptors/connectors 254.

Policy management module 252 is configured to enable administrators, and the like, to provide quick and granular control over a network resource, such as resource server 110 of FIG. 1, by a remote client device. Policy management module 252 may include a text, file, script, database, and the like, that is configured to store dynamic rules, events, conditions, and the like, that may be employed in determining access to the network resource.

Policy management module 252 may be further configured to provide a component, such as an application, control, script, or the like to the client device. Policy management module 252 may receive information from the client device, from the provided component that enables application of a policy. Policy management module 252 may also receive and use information associated with the connection between the client device and network device to apply the policy. Policy management module 252 may, for example, employ the process described in FIG. 3, described in more detail below to manage the client device access to the resource requested.

Policy management module 252 may also be configured to employ one or more adaptors, connectors, and the like, from adaptors/connectors 254 to enable an authorized access to the requested resource.

Policy management module 252 may be further configured to provide a variety of other functions, including, but not limited to auditing, authentication/authorization, session timeout and limit management, security certificate support, cache and file cleanup, role-based administration, a virtual sandbox, and the like.

Policy management module 252 may include a customizable user interface that enables an administrator, or the like, to adjust an overall look and feel of policy management module 252, modify the dynamic rules, and the like.

Adaptors/connectors 254 includes a collection of adaptor and connector applications that enable access to a requested resource. Adaptors may provide secure access from such devices as public client devices, including kiosks, home computers, untrusted devices, and the like. Adaptors may include, but are not limited to, web adaptors, terminal server adaptors, desktop adaptors, Unix system adaptors, host adaptors to such legacy systems as VT100, VT320, Telnet, X-Term, and the like, file server adaptors, email adaptors, mobile adaptors, and the like.

Connectors may provide secure access for a business partner employing an untrusted device, and the like. Connectors may also provide secure access from devices such as trusted devices issued and maintained by the enterprise, and the like. Connectors may enable a native client application to communicate via a secure tunnel between a browser on the client device and network device 200 without a user pre-installing or configuring additional software. In one embodiment, communication is supported using connectors to such resources as email, FTP, network drive mappings, and the like. However, the invention is not limited to these resources and others may be accessed by connectors (and/or adaptors) without departing from the scope or spirit of the invention.

Although illustrated in FIG. 2 as distinct components, policy management module 252 and adaptors/connectors 254 may be arranged, combined, and the like, in any of a variety of ways, without departing from the scope of the invention. For example adaptors/connectors 254 may be deployed distinctly for each adaptor, connector type, function, or the like. Moreover, policy management module 252 and adaptors/connectors 254 may reside in one or more computing devices similar to network device 200.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like. Similarly, network device 200 may include applications that support virtually any tunneling mechanism, including but not limited to VPN, PPP, L2TP, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device configuration information, policy, and the like.

In one embodiment, network device 200 includes one or more Application Specific Integrated Circuit (ASIC) chips (not shown) connected to bus 222. In one embodiment, network interface unit 210 may connect to the bus through the ASIC chip. The ASIC chip may include logic that performs some of the functions of network device 200. For example, in one embodiment, the ASIC chip performs a number of packet processing functions, to process incoming data, apply a policy based on the received data, and based on the policy configure access to a resource, configure a connection between the resource and a client device, apply a virtual sandbox 116 to the client device, its connection, and the like.

In one embodiment, network device 200 includes one or more field-programmable gate arrays (FPGA) (not shown), instead of, or in addition to, the ASIC chip. A number of functions of the network device can be performed by the ASIC chip, by an FPGA, by CPU 212 with the logic of program code stored in mass memory, or by a combination of the ASIC chip and the CPU.

Generalized Operation

Figure 3:
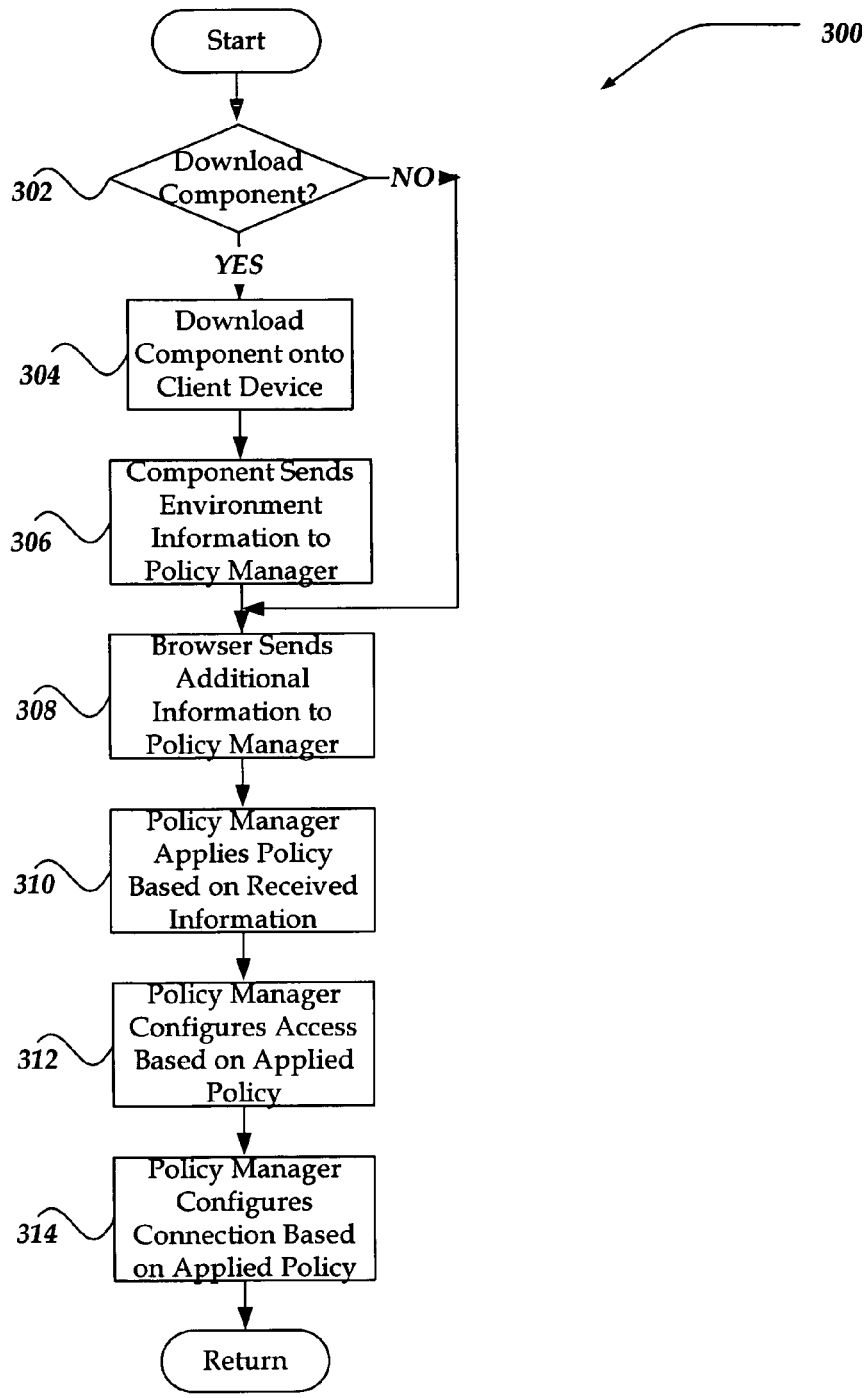
FIG. 3 illustrates a logical flow diagram generally showing one embodiment of a process for managing access to a resource based on a dynamic policy.

The operation of certain aspects of the invention will now be described with respect to FIGS. 3-4. FIG. 3 illustrates a logical flow diagram generally showing one embodiment of a process for managing access to a resource based on a dynamic policy. Process 300 of FIG. 1 may be implemented within RPM 108 of FIG. 1. Process 300 typically is entered when a remote client device such as one of client devices 101-104 of FIG. 1 seeks access to a network resource protected by the invention.

Process 300 begins, after a start block, at decision block 302, where a determination is made whether a component, such as a control, application, script, or the like, may be downloaded onto the remote client device seeking access to the network resource. The component may not be downloadable for a variety of reasons, including, the client device is not able to receive and/or execute the component, the client device has been configured to not accept downloads, and the like. In any event, if it is determined that the component may not be downloaded to the client device, processing branches to block 308; otherwise, process proceeds to block 304, where the component is downloaded onto the client device. The downloaded component may include one or more additional components, including another control, application, script, and the like, configured to inspect the environment associated with the client device, enable a virtual sandbox 116 associated with the client device, and the like. The other downloaded component may also be employed to provide client device cleanup upon session termination, as further described below in conjunction with FIG. 4.

Process 300 proceeds next to block 306, where the downloaded component(s) analyzes the environment associated with the client device. Analysis may include, but is not limited to, determining such information as how the client device is configured, whether it is a trusted or untrusted device, type of encryption enabled on the client device, type of antivirus enabled on the client device, other security features that may be enabled on the client device, and the like. Analysis may also include determining the browser type and version, operating system, including version and patch level, enabled and available security certificates, and the like. Analysis may further include determining whether a hacker tool 114 is enabled on the client device, such as a network sniffer, a screen scraper, a password cracker, or the like. The presence of an enabled hacker tool 114 may indicate an attempt that the client device is not to be untrusted. In any event, the determined information is sent back to a policy manager.

The process continues at block 308, where a browser may send additional information to the policy manager. Browser sent information may include, but is not limited to client-side certificate information, security encryption information, such as might be employed during an SSL/TLS session, and the like. The browser sent information may further include Internet Protocol (IP) information such as IP addresses, port numbers, and the like. The additional information may also be sent by another application, component, and the like, in addition to, or even in place of the client browser, without departing from the scope of the invention.

The process flows next to block 310 where the policy manager applies one or more policies based on the information received from blocks 306-308. Information is also provided to the policy manager to indicate whether the client device precluded a download of the component. Policy decisions may then also employ this additional information.

In any event, upon application of the policies, process 300 flows to block 312, where the policy manager configures access to the requested resource based, in part, on the applied policies. The configured access may include virtually any dynamically configured policy that an enterprise determines appropriate. For example, the enterprise may restrict access for a client device that does not provide for component downloads differently than for a more trusted client device.

Process 300 proceeds next to block 314 where the connection between the client device and the requested resource is configured. The connection may be configured to restrict selected actions, operations, downloads, and the like. Such restrictions may include, but are not limited to, restricting access to a predetermined application, access to a predetermined file, group of files, folders, services, servers, and the like. For example, in one embodiment the connection may be configured to include a virtual sandbox 116 which may restrict a client device from performing certain actions.

The virtual sandbox 116 may include configuring the client device to prevent one or more actions on certain documents, files, and the like. In one embodiment, the virtual sandbox 116 is configured to intercept selected system actions to prevent their completion. For example, the virtual sandbox 116 may disable system actions such as a save command, a print command, a move command, a copy command, other I/O messages, and the like. For example, the virtual sandbox 116 may prevent a save command from saving data to a file, creating a new file, and the like. Similarly, the virtual sandbox 116 may prevent the move command from enabling a move of a file, folder, or the like, from one location to another, including, but not limited to, from one computing device to another computing device. Additionally, the virtual sandbox 116 may restrict the client device from sending an email message, or the like.

The virtual sandbox 116 may also restrict the client device from launching predetermined applications, such as a mail-client, FTP application, and the like.

The virtual sandbox 116 may be implemented employing a variety of mechanisms. For example, the virtual sandbox 116 may include a downloaded component where permitted. The virtual sandbox 116 may also include an interface component arranged to intercept the communications between the client device and the requested resource. The virtual sandbox 116 may then intercept commands, files, and the like, between the requested resource and the client device to restrict transmission of selected requests, files, commands, instructions, data, results, and the like. The virtual sandbox 116 may also send instructions to applications on the client device to selectively restrict actions, disable operations, and the like. For example, the virtual sandbox 116 may send an instruction to the client browser to direct the browser not to save files, documents, and the like.

The virtual sandbox 116 may also redirect access to documents, files, and the like, to a location, remote from the client device. For example, the virtual sandbox 116 may redirect an instruction intended to access a local cache, a bookmark, and the like, on the client device to instead seek access to a location, bookmark, and the like, on a remote server, or the like. In another embodiment, the virtual sandbox 116 may make it appear that the client's browser is writing to or reading from a local location on the client device, even though it is actually writing to or reading from a remote server location.

The virtual sandbox 116 may also direct actions on the client device to encrypt selected files on the client device, employing an encryption key that may reside at a remote server location, employing a key in volatile memory, or the like. In this manner, should a connection be terminated with the resource, the client device loses power, or the like, the files on the client device remain encrypted.

Upon completion of block 314, process 300 returns to a calling process to perform other actions.

Figure 4:
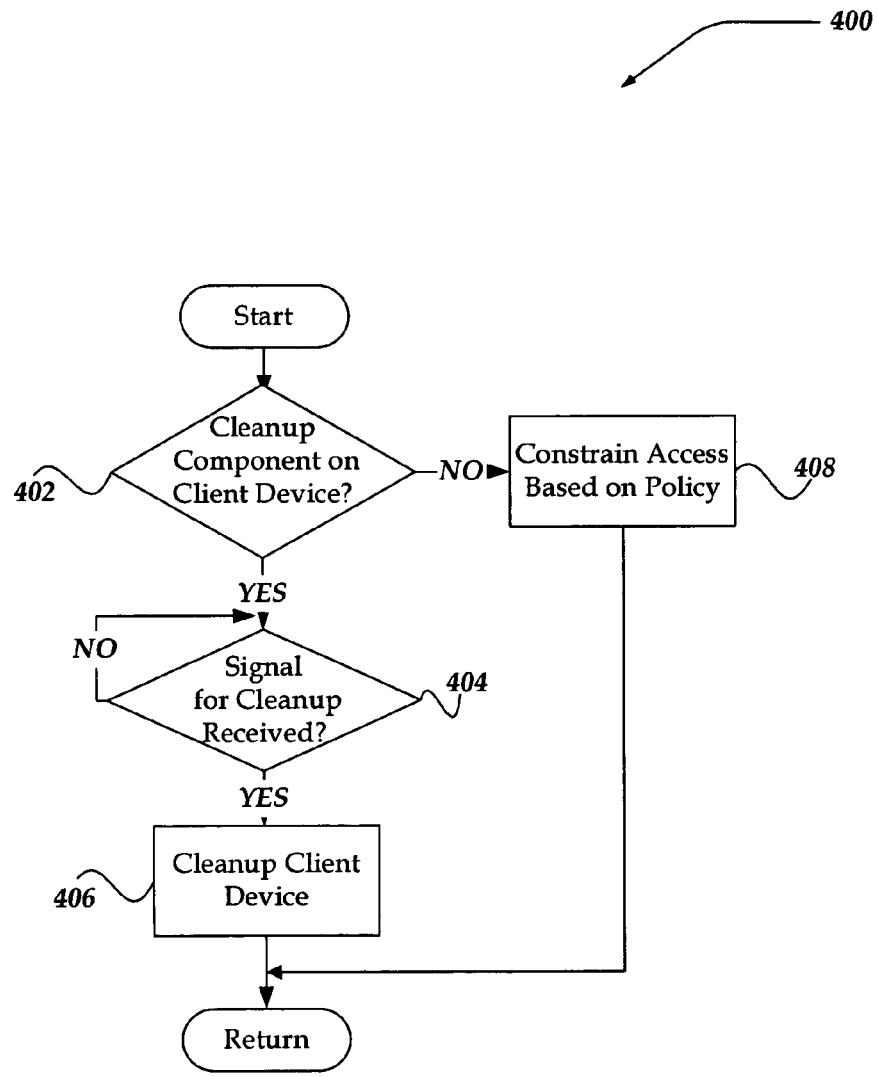
FIG. 4 illustrates one embodiment of logical flow diagram generally showing one embodiment of a process for managing clean-up of a client device, in accordance with the invention.

FIG. 4 illustrates one embodiment of logical flow diagram generally showing one embodiment of a process for managing cleanup of a client device, in accordance with the invention.

Process 400 begins, after a start block, at decision block 402, where a determination is made whether a cleanup component is on the client device. The cleanup component may have been provided to the client device during block 304 of FIG. 3 above, for example. If the cleanup component is on the client device, processing flows to decision block 404; otherwise, processing branches to block 408. At block 408, a virtual sandbox, substantially as described above, is employed to intercept communications between the client device and the requested device. The virtual sandbox is arranged to constrain access, actions, instructions, data, and the like, between the requested resource and the client device. For example, the virtual sandbox may prevent the client device from receiving a file, document, result, and the like, from the resource. The virtual sandbox may also communicate instructions to the client device to inhibit selected actions, redirect other actions, and the like, as discussed above. Upon completion of block 408, process 400 returns to a calling process to perform other actions.

At decision block 404, a determination is made whether a cleanup signal indicates that the client device is to be cleaned. The client cleanup signal may arise for a variety of reasons, including, but not limited to, signing off from the requested resource, a time out, a reboot, and the like. The client cleanup signal may be sent periodically, aperiodically, as a result of a suspicious activity, and the like. The client cleanup signal may be generated from a component within the client device, sent from the policy manager, or even from another component. In any event, if client cleanup is to occur, the process flows to block 406; otherwise, the process loops through decision block 404, until the client cleanup signal is received.

At block 406, cleanup of the client device is performed by the cleanup component. Cleanup of the client device may include, but is not limited to, overwriting, deleting, and the like, a selected file, directory, cached area, disk area, a temporary file, a cached file, and the like. Cleanup may also include enabling system actions, application actions, operations, and the like, that may have been disabled, redirected, and the like, during the connected session. Upon completion of block 406, process 400 returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A hardware apparatus for managing access to a resource over a network, comprising:
    a receiver that receives a request for access to the resource from a client device; and
    a policy manager, coupled to the receiver, that performs actions, including:
        downloading a component onto the client device, wherein the downloaded component inspects the client device to detect a configuration of the client device, including determining whether client-security software other than a virtual sandbox is active on the client device;
        receiving from the downloaded component the configuration of the client device based on the inspection;
        in response to the received request, applying, using the apparatus, a dynamic policy for the access based, in part, on the received configuration and the requested resource;
        employing the virtual sandbox at the client device to encrypt the resources using an encryption key that is separately stored on a remote server device; and
        applying, using the apparatus, a restriction to the client device for access by the client device to the requested resource, the restriction based on the applied dynamic policy.

2. The apparatus of claim 1, wherein determining the configuration of the client device further comprises:
    if the client device is configured to not download the component, then receiving the configuration of the client device through a browser residing on the client device.

3. The apparatus of claim 1, wherein the received configuration indicates whether the client device is operating as a kiosk.

4. The apparatus of claim 1, wherein determining the configuration of the client device further comprises determining information associated with the connection between the client device and the resource.

5. The apparatus of claim 1, wherein inspecting the client device-to detect a configuration further comprises detecting if security software is installed on the client device and if security software is installed, inspecting the security software to detect if the security software is active or disabled.

6. The apparatus of claim 1, wherein applying the restriction further comprises employing a virtual sandbox that is configured based on the applied dynamic policy.

7. The apparatus of claim 1, wherein the restriction includes at least one downloadable component.

8. The apparatus of claim 1, wherein the restriction intercepts a communication between the client device and the apparatus.

9. The apparatus of claim 1, wherein applying the restriction further comprises performing at least one of inhibiting a file save and inhibiting a file print.

10. A method implemented at a network device of managing access to a resource over a network, comprising:
    receiving at the network device a request for access to the resource from a client device;
    downloading a component onto the client device, wherein the downloaded component inspects the client device to detect a configuration of the client device, including determining what client security software is active on the client device;
    receiving from the downloaded component the configuration of the client device based on the inspection;
    in response to the received request, applying, using the network device, a dynamic policy for the access based, in part, on the received configuration and the requested resource;
    employing a virtual sandbox at the client device to encrypt the resources using an encryption key that is separately stored on a remote server device; and
    applying, using the network device, a restriction to the client device for access by the client device to the requested resource, the restriction based on the applied dynamic policy.

11. The method of claim 10, further comprising in response to receiving the request for access to the resource, transmitting a downloadable component to the client device.

12. The method of claim 10, wherein receiving the configuration further comprises: receiving information indicating whether the client device is a laptop, personal computer, kiosk, or a mobile device.

13. The method of claim 10, wherein receiving the configuration further comprises: receiving information indicating at least one of one level of trust associated with the client device, a type of encryption enabled on the client device, a type of antivirus enabled on the client device, a security feature enabled on the client device, a browser type, an operating system configuration, a security certificate, and if a hacker tool is enabled on the client device.

14. The method of claim 10, wherein receiving the configuration further comprises: receiving information indicating a level of trust of the client device.

15. The method of claim 10, wherein receiving the configuration further comprises: receiving information indicating a characteristic of an enabled security application enabled.

16. The method of claim 10, wherein applying the restriction further comprises downloading a component to the client device.

17. The method of claim 10, wherein applying the restriction further comprises configuring a virtual sandbox to intercept a communication between the client device and the resource.

18. The method of claim 17, wherein intercepting the communication further comprises blocking a download of at least one file to the client device.

19. The method of claim 10, wherein applying the restriction further comprises: if the access to the resource is terminated, performing cleanup on the client device including at least one of deleting a cached file, deleting a temporary file, and enabling a disabled system command.

20. The method of claim 10, wherein applying the dynamic policy further comprises determining at least one of a connector, and an adaptor to enable the access to the resource.

21. The method of claim 10, wherein applying the dynamic policy further comprises restricting the access to the resource.

22. A hardware network appliance for managing access to a resource over a network, comprising:
    a transceiver for receiving a request for access to the resource from a client device; and
    a processor that performs actions, including:

receiving at the network appliance the request for access from the client device;

downloading a component onto the client device, wherein the downloaded component inspects for a configuration of the client device including what client security software is active on the client device;

receiving from the downloaded component information about the configuration of the client device based on the inspection;

in response to the received request, applying, using the network appliance, a dynamic policy for the access based, in part, on the received configuration and the requested resource;

employing a virtual sandbox at the client device to encrypt the resources using an encryption key that is separately stored on a remote server device; and applying, using the network appliance, a restriction to the client device for access by the client device to the requested resource, wherein the restriction is configured based on the applied dynamic policy.

23. The network appliance of claim 22, wherein the processor performs further actions, comprising: in response to receiving the request for access to the resource, receiving additional information about the configuration of the client device through a query with a browser residing on the client device.

24. The network appliance of claim 22, wherein applying the restriction further comprises employing a virtual sandbox that is configured based on the applied dynamic policy.

25. The network appliance of claim 23, wherein determining the configuration of the client device further comprises:

if the client device is not configured to receive a downloadable component, receiving information about the configuration of the client device through a browser application residing within the client device.

26. The network appliance of claim 22, wherein applying the dynamic policy further comprises:

if the client device is configured to restricting a download of a component, restricting access to the resource.

27. The network appliance of claim 22, wherein applying the restriction further comprises:

if the client device is configured to restrict a download of a component, intercepting a communication between the client device and the requested resource to perform at least one of preventing an access to file, and restricting an action.

28. A non-transitory computer readable storage medium that includes data and instructions, wherein the execution of the instructions on a computing device provides for managing access to a resource over a network by enabling actions, comprising:

receiving at the computing device a request for access to the resource from a client device;

downloading a component onto the client device, wherein the downloaded component inspects for a configuration of the client device including whether client security software is active on the client device;

receiving from the downloaded component information about the configuration of the client device based on the inspection;

in response to the received request, applying, using the computing device, a dynamic policy to the access based, in part, on the configuration of the client device and the requested resource;

employing a virtual sandbox at the client device to encrypt the resources using an encryption key that is separately stored on a remote server device; and applying, using the computing device, a restriction to the client device for access by the client device to the requested resource, the restriction based on the applied dynamic policy.

29. The computer readable storage medium of claim 28, wherein applying the restriction further comprises configuring a virtual sandbox to intercept a communication between the client device and the resource.

30. The computer readable storage medium of claim 28, wherein applying the restriction further comprises blocking a download of at least one file to the client device.

31. A hardware apparatus for managing access to a resource over a network, comprising:

a transceiver that receives a request for access to the resource from a client device; and a policy manager, coupled to the transceiver, that performs actions, including:

downloading a component onto the client device, wherein the downloaded component inspects the client device to detect a configuration of the client device including what client security software is active on the client device and whether a hacker tool is enabled on the client device;

receiving from the downloaded component information about the configuration of the client device based on the inspection, wherein the configuration includes at least an indication of a status of an security application residing on the client device including whether the application is active or disabled;

in response to the received request, applying, using the apparatus, a dynamic policy for the access based, in part, on the configuration and the requested resource;

employing a virtual sandbox at the client device to encrypt the resources using an encryption key that is separately stored on a remote server device; and restricting, using the apparatus, the client device for access by the client device to the requested resource, wherein the means for restricting is configured based, in part, on the applied dynamic policy.

32. A method implemented at a server device for managing access to a resource over a network, comprising:

receiving, at the server device, a request for access to the resource from a client device;

determining, using the server device, a level of security software enabled on the client device, including what antivirus software is active on the client device and whether a hacker tool is enabled on the client device;

in response to the received request, applying, using the server device, a dynamic policy to the access based, in part, on the determined level of security software enabled and the requested resource;

employing a virtual sandbox at the client device to encrypt the resources using an encryption key that is separately stored on a remote server device; and applying, using the server device, a restriction to the client device for access by the client device to the requested resource, the restriction based on the applied dynamic policy.

33. A method implemented at a network appliance for managing access to a resource over a network, comprising:

receiving at the network appliance a request for access to the resource from a client device;

determining if the client device is configured as a kiosk or a mobile device and whether client computing security software is active on the client device or whether a hacker tool is enabled on the client device;

employing a virtual sandbox at the client device to encrypt the resources using an encryption key that is separately stored on a remote server device; and in response to the received request, applying, using the network appliance, a restriction to the client device for access by the client device to the requested resource, the restriction based on the determined configuration of the client device and the requested resource.

\* \* \* \* \*